April 18, 1950  M. STAUNT  2,504,233
DENTAL HAND PIECE
Filed Nov. 28, 1947
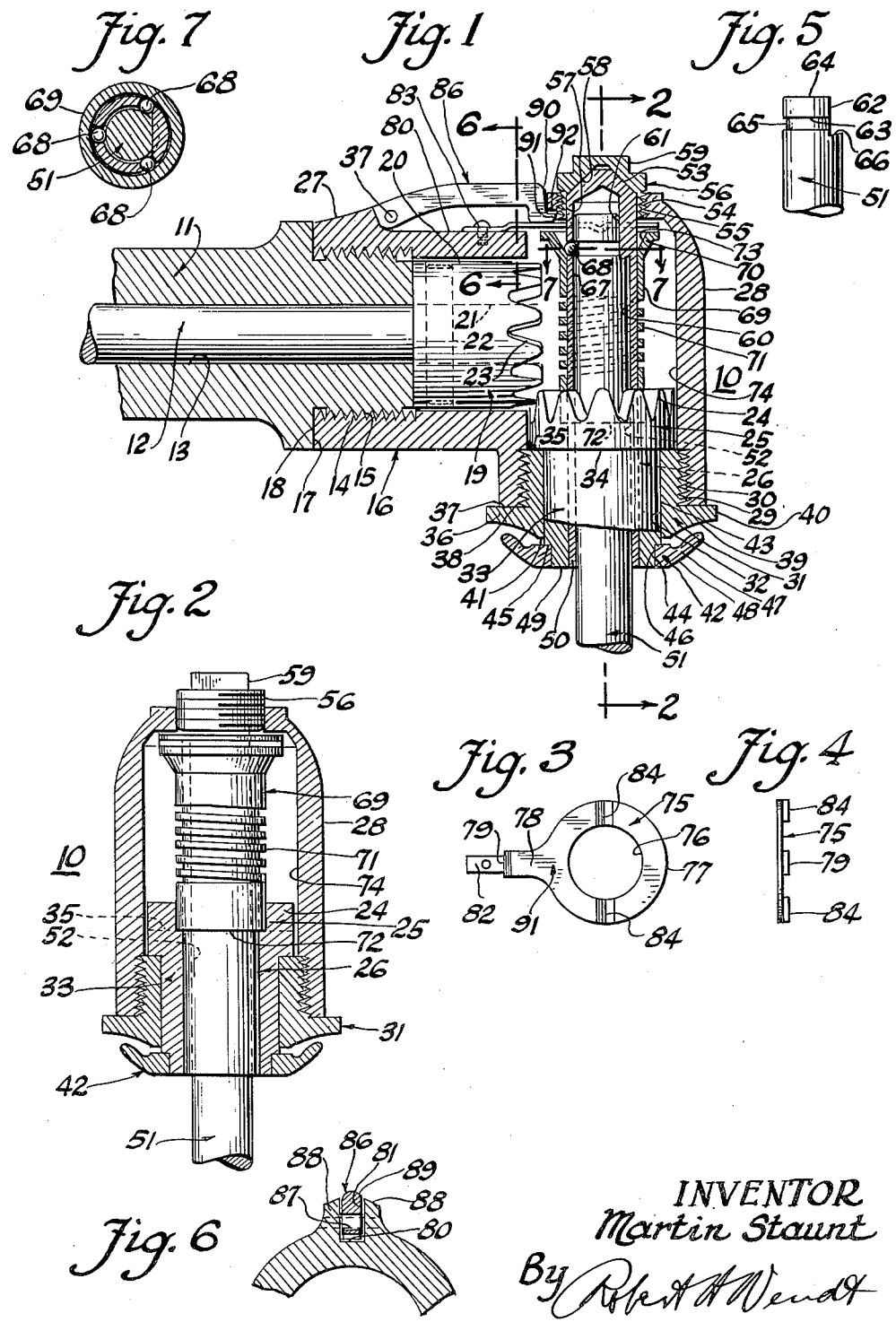
INVENTOR
Martin Staunt
By Robert H Wendt
his Attorney Patented Apr. 18, 1950

2,504,233

UNITED STATES PATENT OFFICE 2,504,233

DENTAL HAND PIECE

Martin Staunt, Chicago, Ill.

Application November 28, 1947, Serial No. 788,558

2 Claims. (Cl. 32—29)

The present invention relates to dental hand pieces, and is particularly concerned with devices or arrangements by means of which the various dental drills, burrs, sanding wheels, or other tools are secured in the hand piece.

One of the objects of the invention is the provision of an improved dental hand piece, which is provided with an improved means for securing the shank of a tool in the hand piece, in such manner that the shank is positively held and secured against axial movement and caused to rotate with the driving mechanism of the handpiece.

Another object of the invention is the provision of an improved dental handpiece which is adapted to be used with standard tools which are now on the market, and which is adapted to grip them quickly and positively, and is also adapted to effect a quick release without the difficulties which are encountered with some of the devices of the prior art.

A further object of the invention is the provision of an improved dental handpiece, in which the structure is simple, capable of economical manufacture, sturdy, uniform in its operation, and adapted to be used for a long period of time without necessity for repair or replacement of any of its parts.

Another object of the invention is the provision of an improved dental handpiece, in which the grip of the tool shank is automatic, and always in the same manner with substantially the same pressure, and in which the shank may be instantly released, the latter being accomplished merely by pressing a resilient member, and the former merely by releasing it and removing the pressure of the thumb or fingers.

Another object of the invention is the provision of an improved contra-angle structure, in which all of the bearings are enclosed and adequately protected against ingress of saliva or gritty materials such as are sometimes used in polishing teeth, so that the bearing lubrication may be maintained at all times, thus assuring a long life.

Other objects and advantages of the invention will be apparent from the following description and the accompanying drawings, in which similar characters of reference indicate similar parts throughout the several views.

Referring to the single sheet of drawings,

Fig. 1 is a fragmentary sectional view, taken through the driving head or contra-angle of a dental handpiece, embodying the invention, on a plane determined by the axes of the driving and driven shafts;

Fig. 2 is a fragmentary vertical sectional view, taken on the plane of the line 2—2 of Fig. 1, looking in the direction of the arrows;

Fig. 3 is a bottom plan view of an intermediate actuating member by means of which the grip of the tool shank is controlled;

Fig. 4 is a side elevational view of the intermediate actuating member of Fig. 3;

Fig. 5 is a fragmentary side elevational view of the end of standard tool shank for dental burrs or the like, which the present handpiece is adapted to receive and use;

Fig. 6 is a fragmentary sectional view taken on the plane of the line 6—6 of Fig. 1, looking in the direction of the arrows; and Fig. 7 is a fragmentary sectional view taken on the plane of the line 7—7 of Fig. 1, looking in the direction of the arrows.

Referring to Figs. 1 and 2, 10 indicates in its entirety the driving head or contra-angle of the handpiece, which is carried by the tubular housing 11, having a driving shaft 12. The tubular housing 11, may be part of the standard handpiece housing itself, or it may be part of an attachment commonly called a contra-angle, the housing of which is carried by the handpiece, and the shaft of which is gripped by a handpiece chuck.

The housing member 11, constitutes a bearing for the shaft 12, by means of its cylindrical bore 13, in which the shaft 12 is mounted for rotation, and it may also be called a bearing member. Bearing member 11 preferably has a reduced threaded end portion 14, to be received in the threaded bore 15, of the contra-angle housing 16. An annular shoulder 17, on the bearing member 11, engages the plane end surface 18 on the contra-angle housing 16.

The shaft 12 carries a pinion 19, at its right end in Fig. 1, and the pinion 19 comprises a substantially cylindrical body having an outer cylindrical surface 20 and having a cylindrical bore 21. Pinion 19 is secured to shaft 12 by a transverse through pin 22, and pinion 19 is provided at its right end with axially projecting gear teeth 23.

Gear teeth 23 are adapted to mesh with and drive the gear teeth 24 on a driven pinion 25 which drives the tool shaft 26. The contra-angle housing 16 comprises a metal member having two tubular portions 27 and 28 which are at substantially right angles to each other. The tubular portion 28 ends in a threaded bore 29 which is adapted to receive the outer threads 30 of a bearing member 31 threaded in the end of the tubular portion 28.

The bearing member 31 has a cylindrical bore 32 for receiving the hub 33 of the driven pinion 25. Pinion 25 has an annular thrust surface 34 engaging the end 35 of the bearing 31 for holding the teeth 24 in mesh with the teeth 23. Bearing 31 also has a radially extending flange 36, the rear annular surface 37 of which engages the end 38 of the tubular portion 28 of the housing.

The outside of the annular flange 36 may be formed with a concavely curved annular surface 39, and the periphery 40 of the flange 36 may be noncircular for receiving a wrench. Adjacent the hub 33 the outer surface of the bearing flange 36 may be flat at 41, but there is always a clearance between this surface and the saliva guard so as to reduce friction at the point.

The hub 33 has an outer cylindrical surface 43 to be rotatably received in the bearing bore 32, and the hub 33 is long enough to project axially from the bearing bore 32. At its outer end hub 33 has a reduced cylindrical portion 44, and an annular shoulder 45 for receiving and engaging the saliva guard 42.

Saliva guard 42 comprises an annular metal member having a central bore 46 for receiving the reduced end 44. The saliva guard has a radially extending flange 47 which curves backward toward the concave surface 39, but does not engage the surface as there is a clearance between them.

The outer curved surface 48 of saliva guard 42 is flush with the end 49 of the bearing 33 and with the end 50 of the driven shaft 26. The radial flange 47 of the saliva guard 42 is preferably kept inside the boundaries of the bearing flange 36 so that the saliva guard does not project far enough to come into contact with the gums or parts of the mouth of the patient, as the saliva guard 42 rotates with the shaft 36 and tool shank 51.

By virtue of the radially projecting flange 47 the saliva guard 42 tends to throw off saliva which might otherwise find its way into the bearing bore 32, but the backward curvature of the flange 47 directs the saliva against the curved surface 39 of the bearing flange 36.

The hub 33 of pinion 25 has a cylindrical bore 52 which is adapted to receive a tubular driven shaft 26, which may be brazed or soldered to the pinion 25. Shaft 26 comprises a cylindrical metal member which may be closed at its upper end, the upper end having an external frusto-conical surface 53. At its upper end the tubular portion 28 of the housing has a threaded bore 54 for receiving the threads 55 of a cap bearing member 56.

This cap bearing member has a cylindrical bore 57 for receiving the end of the tubular shaft 26, and it has a frusto-conical surface 58 for engaging the complementary end surface 53 on the shaft 26. The cap bearing member 56 is made as short as possible so that it does not project far from the housing portion 28, and it may have an external noncircular portion 59 for engagement with a wrench.

The tubular shaft 25 has an internal cylindrical bore 60 of sufficient size to receive the cylindrical tool shank 51, but at its upper end the bore 60 has an inwardly projecting portion with a flat surface 61. This flat surface 61 is adapted to engage the flat surface 62 on the end portion of every tool shank 51, as shown in Fig. 5. The standard tool shank has a groove 63 extending about its periphery near to its upper end 64, the groove 63 terminating at the flat surface 62. The groove 63 is preferably rectangular in cross-section, the bottom 65 of the groove being a cylindrical surface. The engagement between the flat surfaces 62 on the shank 51 and 61 in the shaft bore 60 holds the shank against rotation with respect to the shaft.

The end surface 66 of the cylindrical portion of the shank at the flat surface 62 may be slightly undercut. Shaft 26 also has one or more through bores 67 of sufficient size to receive a steel ball 68, and each end of the through bore 67 is slightly spun over so that the ball 68 is retained in the bore 67 and does not drop out when the shank 51 is removed.

The diameter of the ball 68 is greater than the thickness of the tubular shaft wall 26, so that the ball 68 may project into the groove 65 of the tool shank 51 when the parts are in the position of Fig. 1. The shaft 26 is surrounded by a ball actuating member 69 comprising a tube having a frusto-conical flange 70 at its upper end.

The tube 69 may be engaged by a helical coil spring at its lower end or the coil spring 71 may be formed as an integral part of the tube 69. At its lower end the spring 71 reacts against an annular surface 72 on driven pinion 25 inside the teeth 24. At its upper end the inner frusto-conical surface 73 engages the ball 68 and cams it inward in the bore 67 into the groove 65 of the tool shank 51. Spring 71 constantly urges the ball into position to engage in groove 65 of tool shank 51 whereby the tool shank 51 is held in the tubular shaft 26.

In order to release the tool shank 51 from the shaft 26 the chamber 74 in the tubular portion 28 contains an intermediate actuating member 75 in the form of a flat spring, as shown in Fig. 3. This intermediate actuating member has a central bore 76 for clearing the outer cylindrical surface of shaft 26, and it may have an outer circular boundary 77. At one side the circular boundary 77 has a radial extension 78 which is turned downwardly at 79 to bear against the base 80 of a groove 81 in the tubular portion 27.

The extension 78 then extends horizontally in Fig. 1, and has an attaching flange 82 which is secured to the base 80 of groove 81 by a screw bolt 83. Thus intermediate actuating member 75 is firmly supported at its left end, and it may be so shaped that it is urged upward against the inside of the top of tubular housing 28 out of engagement with the end of the tubular member 69.

The member 75 preferably has a pair of V-shaped knife-edged ridges 84 on its lower side. These engage the upper flat end of the tubular member 69 when the spring 75 is pushed downward, but ordinarily the ridges 84 do not engage the end of the tube 69 because the tube 69 stops short of the ridges 84 when it urges ball 68 into final position in groove 65. This clearance between ridges 84 and end 85 of tubular member 69 prevents running friction at this point.

The groove 81 may be a rectangular slot in the upper wall of the tubular portion 27, and it is adapted to receive a manual actuating member 86, which is pivotally mounted upon a through pin 87 carried by tubular portion 27. In order to house the lever 86 tubular portion 27 may have a pair of upwardly projecting ribs or flanges 88, one on each side of the groove 81.

The manual actuating member 86 comprises a substantially rectangular lever with a rounded upper thumb surface 89 and a downward turned end 90 that engages the spring 75 at a point indicated in Fig. 3 at 91. Manual actuating member 86 projects from groove 81 enough to be engaged by the thumb at its extreme end on the side of the downwardly projecting portion 90 on which there may be a projecting lip 91, and the end of the groove 81 may have a shoulder 92 overhanging the lip 91 so that lever 86 is limited in its upward motion, and cannot swing out of slot 81. Lip 91 is inserted beneath shoulder 92 before the pin 37 is driven into its friction bore.

The operation of my handpiece for holding tool shanks is as follows: When a tool shank 51 is to be inserted in the bore 60 of shaft 26 the thumbpiece 86 may be pressed until intermediate actuating member 75 brings its knife edges 84 into engagement with the end of tubular member 69.

Tubular member 69 may then be pressed downward compressing the spring 71 and permitting the ball 68 to move radially outward until the cylindrical end of tool shank 51 can pass the ball 68. The tool shank must be turned until the flat surface 62 registers with the flat surface 61 in the bore 60, and then the shank may be inserted to the position of Fig. 1.

Upon relieving pressure on the thumbpiece 86 spring 75 will lift its knife edges 84 from the end of tube 69, and the frusto-conical inner surface 73 will cam the ball 68 radially inward until it is seated in the groove 65, holding the tool shank in the tubular shaft 26.

When the tool shank 51 is to be released, it is only necessary to press upon the thumbpiece 86 which engages actuating member 75 which drives tubular member 69 downward permitting ball 68 to be cammed out of slot 65 as the shank 51 is withdrawn.

It will thus be observed that I have invented an improved structure for dental handpieces, by means of which a dental tool, such as a burr or drill may be inserted and secured automatically in the drive shaft of the contra-angle. All that is needed is to insert the tool shank while twirling it slightly between the fingers, and at the same time to press upon the thumb piece 86, momentarily, and the latter being released while the shank is in its final position, the shank is firmly secured in the shaft.

The present invention may be used with standard tool shanks now on the market, and it is a simple matter to remove the tool, as it is only necessary to press the thumb piece 86, and then simultaneously pull on the tool. With the present invention the tool shank does not protrude from the top of the contra-angle, but is fully enclosed. The bearings of the present device are also protected against entrance of saliva or grit, and the device may be used for a long period of time without necessity for repair or replacement of any of its parts.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a contra-angle for dental hand pieces, the combination of a housing having a pair of tubular portions extending transversely to each other, with a bearing threadedly mounted in each of said tubular portions, a drive shaft having a gear in one of said tubular portions and a driven gear in the other of said tubular portions, said driven gear having a cylindrical hub projecting from its bearing, a rotatable saliva guard fixedly secured to said hub and rotating with the hub, said guard being arranged flush with the outer end of the hub, and having a backwardly turned substantially conical portion overlying the end of the adjacent bearing, a tubular shaft located in said hub and extending upwardly, and provided with a second threaded bearing carried by said housing at its other end, the said shaft having a cylindrical bore terminating at said other end in a partially cylindrical portion having a flatted side wall for engagement with a standard shank of a dental tool, a tubular resilient metal member surrounding said tubular shaft above the driven gear, said resilient member having one tubular end engaging the hub of the driven gear and being formed with a plurality of integral helical spring portions integrally joined to another tubular portion, said latter tubular portion having a bell shaped frusto-conical end portion, said tubular shaft being provided with a plurality of regularly spaced apertures located in the same plane, which is transverse to the axis of the shaft, and said apertures each being provided with a ball for engaging in a groove in the dental tool shank, the said bell shaped portion urging the balls inwardly into said groove, and means carried by the contra-angle for compressing said resilient member and moving the bell shaped portion longitudinally away from the balls to permit the balls to move out of the groove to release the shank of the dental tool.

2. In a contra-angle for dental hand pieces, the combination of a housing having a pair of tubular portions extending transversely to each other, with a bearing threadedly mounted in each of said tubular portions, a drive shaft having a gear in one of said tubular portions and a driven gear in the other of said tubular portions, said driven gear having a cylindrical hub projecting from its bearing, a rotatable saliva guard fixedly secured to said hub and rotating with the hub, said guard being arranged flush with the outer end of the hub, and having a backwardly turned substantially conical portion overlying the end of the adjacent bearing, a tubular shaft located in said hub and extending upwardly, and provided with a second threaded bearing carried by said housing at its other end, the said shaft having a cylindrical bore terminating at said other end in a partially cylindrical portion having a flatted side wall for engagement with a standard shank of a dental tool, a tubular resilient metal member surrounding said tubular shaft above the driven gear, said resilient member having one tubular end engaging the hub of the driven gear and being formed with a plurality of integral helical spring portions integrally joined to another tubular portion, said latter tubular portion having a bell shaped frusto-conical end portion, said tubular shaft being provided with a plurality of regularly spaced apertures located in the same plane, which is transverse to the axis of the shaft, and said apertures each being provided with a ball for engaging in a groove in the dental tool shank, the said bell shaped portion urging the balls inwardly into said groove, and means carried by the contra-angle for compressing said resilient member and moving the bell shaped portion longitudinally away from the balls to permit the balls to move out of the groove to release the shank of the dental tool, the said means comprising a lever pivoted on the top of the contra-angle and having an end portion engaging the inside of the housing to limit its outward movement, and a leaf spring located between the lever and the housing and secured to the housing, said leaf spring having a pair of arms provided with downwardly turned knife edges for engaging diametric points on the bell shaped portion of the resilient member, so that a pressure on the pivoted lever urges the leaf spring downward and compresses the resilient member to release a tool shank.

MARTIN STAUNT.

REFERENCES CITED

The following references are of record in the file of this patent:

UNITED STATES PATENTS

| Number | Name | Date |
| --- | --- | --- |
| 1,465,690 | Smith | Aug. 21, 1923 |
| 1,638,175 | Terry | Aug. 9, 1927 |
| 1,853,089 | Skinner | Apr. 12, 1932 |
| 2,010,210 | Witt | Aug. 6, 1935 |